United States Patent [19]

Huang

[11] Patent Number: 4,747,314

[45] Date of Patent: May 31, 1988

[54] RACKET TESTER

[76] Inventor: Ben T. Huang, 82 Ta-An St., Hsi-Chih Town, Taipei County, Taiwan

[21] Appl. No.: 19,055

[22] Filed: Feb. 26, 1987

[30] Foreign Application Priority Data

Nov. 13, 1986 [TW] Taiwan ............................. 75,210,748

[51] Int. Cl.⁴ .......................... G01L 5/08; G01N 3/20
[52] U.S. Cl. ...................................... 73/862.45; 73/65; 73/852
[58] Field of Search ...................... 73/65, 852, 862.45, 73/862.47, 862.48, 862.58

[56] References Cited

U.S. PATENT DOCUMENTS

| | | | |
|---|---|---|---|
| 1,771,340 | 7/1930 | Martin | 73/862.58 X |
| 4,077,256 | 3/1978 | Hollander | 73/862.45 |
| 4,488,444 | 12/1984 | Weidmann et al. | 73/862.45 |

Primary Examiner—Charles A. Ruehl
Attorney, Agent, or Firm—Ladas & Parry

[57] ABSTRACT

A racket tester includes a flat plate, a support, a knob attached with a screw rod, an pneumatic cylinder including a piston and a pressure gauge, a base, a ring, an indicia marking, a round rod, a stand, and a weighing unit. By properly associating the above-mentioned members, the racket tester of the present invention is capable of testing the tension of the face of the racket netting, the flex of the racket shaft, and the equilibrium point and the weight of the racket.

5 Claims, 3 Drawing Sheets

RACKET TESTER

FIELD OF THE INVENTION

The present invention relates to a racket tester and, in particular, to a racket tester for testing a variety of properties of a racket.

BACKGROUND OF THE INVENTION

Conventional racket testers, such as that shown in FIG. 1 are capable only of testing the tension of a racket netting face. One such tester is disclosed in Republic of China New Utility Model No. 15478 as comprising a square rod 26 disposed on the racket frame 20 on which a support 24 and a calibrated scale 21 are fixed. A lever 23 has the support 24 as the fulcrum. A tension measuring disk 27 has a shaft 25 extending up from the netting face 28 of the racket frame 20 to engage with one end of the lever 23. The tension measuring disk 27 will be lifted as a counterweight 22 is applied to the other end of the lever, thus allowing one to know the tension of the netting face 28 from the calibrated scale as indicated by the lever 23.

SUMMARY OF THE INVENTION

In order to obtain a racket tester having of diversified functions, the applicant has devoted himself to elaborate researches and has designs revised again and again, and resulted in an improved racket tester of the type as embodied in the present invention.

An object of the present invention is to provide a racket tester which is capable of accurately measuring the tension of the netting face, the flex along the racket shaft, as well as the equilibrium point and the weight of the racket.

Another object of the present invention is to provide a racket tester which has the advantage that the tester can be constructed of plastic materials.

The racket tester according to the present invention is characterized by comprising a flat plate, a support fixed on the plate, a knob attached with a screw rod and pivotally secured on the support, and a pneumatic cylinder including a piston and a pressure gauge; the piston being threadingly engaged with the screw rod, and the pressure gauge communicating with the cylinder; as the netting face of the racket being placed between the flat plate and the bottom of the cylinder, the piston being permitted to displace downwardly a specific distance by rotating the knob, such that a specific volume is established between the piston and the inner wall of the cylinder by the fact that the bottom of the cylinder is responsive to the tension of the netting face, allowing one to know the tension from the indication on the presure gauge.

The racket tester according to the present invention is further characterized by comprising a base extending through the bottom of the pneumatic cylinder and having a flat bottom surface, and a ring disposed just under the base, so that the netting face is permitted to move freely over the ring when it is placed between the bottom surface and the ring, thereby allowing one to measure the tension in any particular area of the netting face at the operator's option.

The racket tester according to the present invention is further characterized by comprising indicia markings attached on the flat plate, a round rod rotably disposed in a particular position on the plate and allowing to be placed on one end of the plate, and a stand disposed on the other end of the plate, such that when the round rod is placed in a particular position with the racket positioned transversely on the round rod, and the racket is caused to reach its balance by rotating the rod, one is allowed to obtain the property concerning the equilibrium of the racket from the position of the grip of the racket relative to the indicia markings. In addition, when the round rod is disposed on one end of the flat plate with the head (middle section of the frame) and the tail (lower end of the grip) of the racket being placed on the round rod and the stand, respectively, a portion on said racket slightly below the throat of the racket is pressed down by the bottom of the cylinder (or by the base), the flex of the shaft being thus obtained.

The racket tester according to the present invention is still further characterized by comprising a weighing unit positioned on the flat plate so that the weight of the racket can be readily measured.

BRIEF DESCRIPTION OF THE DRAWINGS

The present invention will be clearly understood from the following description taken in conjunction with the accompanying drawings, in which.

DETAILED DESCRIPTION OF THE PREFERRED EMBODIMENT

Figure 1:
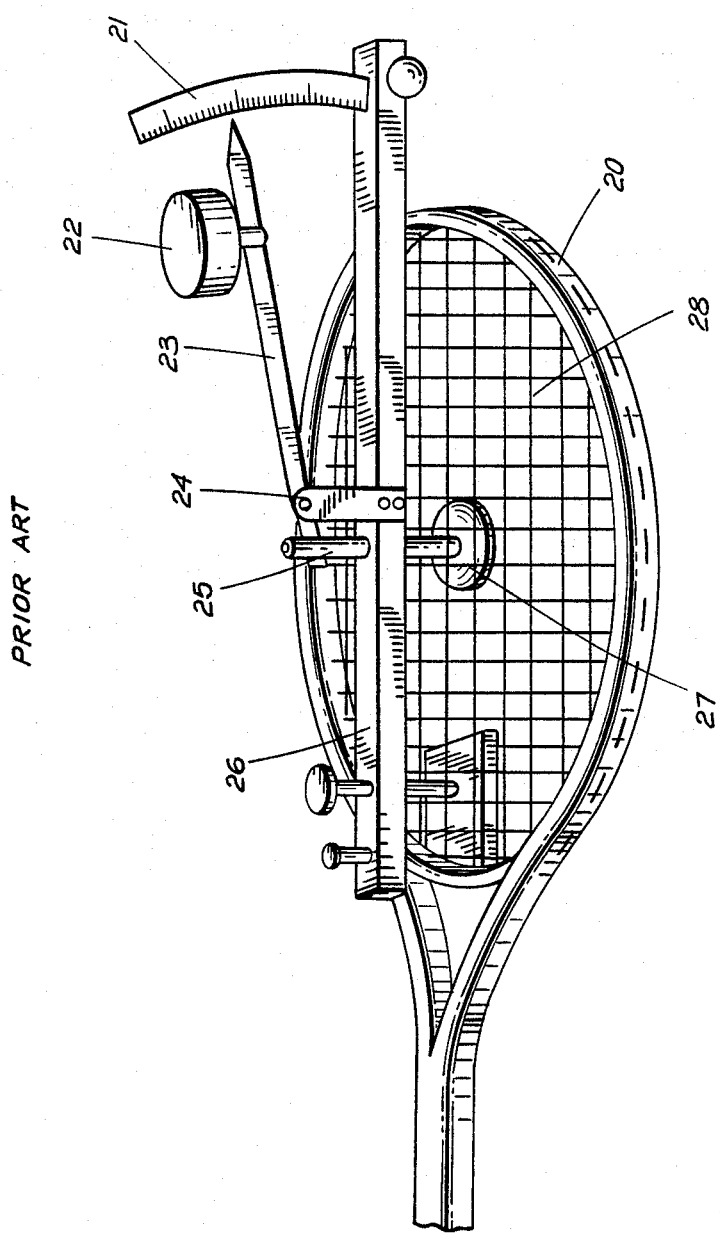
FIG. 1 is a perspective view of a conventional racket tester.
Figure 2:
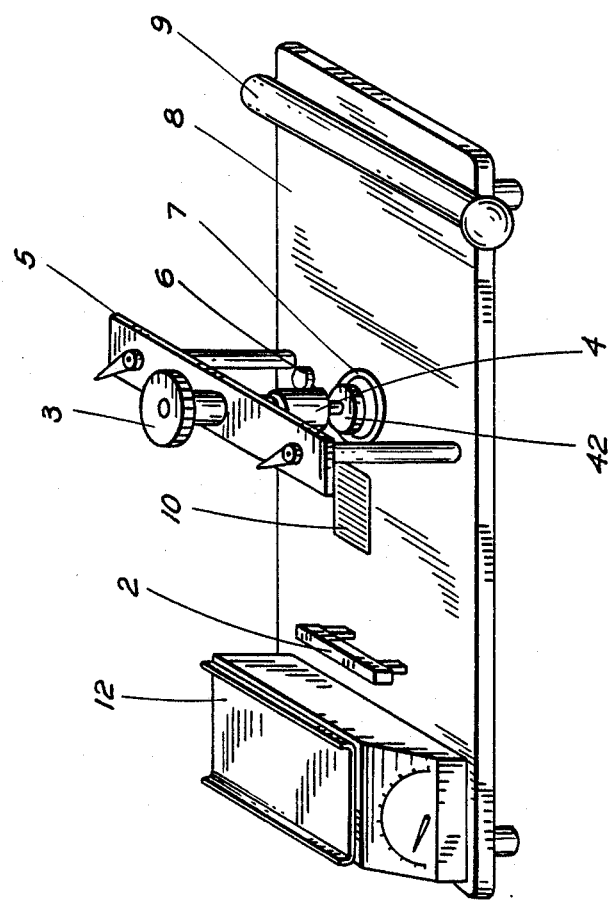
FIG. 2 is a perspective view of an embodiment according to the present invention.
Figure 3:
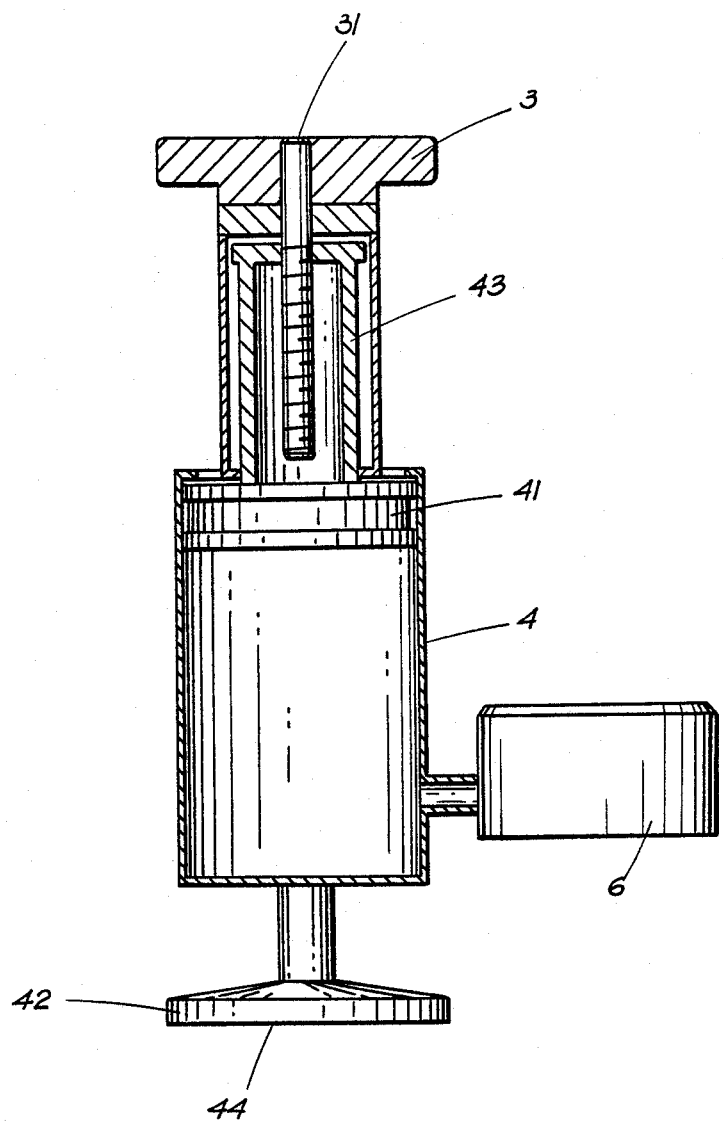
FIG. 3 is a cross section view of an embodiment of the pneumatic cylinder according to the present invention.

A preferred embodiment of the racket tester according to the present invention is shown in FIGS. 2 and 3, which comprises a flat plate 8, a support 5 fixed on the plate 8, a knob 3 attached with a screw rod 31 and rotatably fixed on the support 5, a ring 7, and a pneumatic cylinder 4. The cylinder 14 includes a piston 41, a pressure gauge 6, and a base 42. The upper extension 43 of the piston 41 engages threadingly with the screw rod 31; the pressure gauge 6 communicates with the cylinder 4, thereby to indicate the air pressure within the cylinder; and the base 42 protrudes from the bottom of the cylinder 4 and has a flat bottom surface 44. When the netting face of a racket is placed between the flat bottom surface 44 and the ring 7, and the knob 3 is rotated, causing the piston 41 to displace downwardly a specific distance, the volume as established between the piston 41 and the inner wall of the cylinder 4 will be adjusted through the base 42 in response to the tension of the netting face, and the specific pressure of the given quantity of air confined in the specific volume will be indicated on the pressure gauge, thus allowing one to obtain the tension of the netting face. Also, the netting face can be moved freely over the ring 7, and therefore, the tension in any particular area of the netting face can be measured with the racket tester of the present invention at the operator's option.

The racket tester of the present invention further comprises indicia markings 10, a round rod 9, and a stand 2. The indicia markings can be in the form of a label stuck on the flat plate 8, or directly marked on the plate 8. The round rod 9 is disposed on one end of the plate 8. When the round rod 9 is placed in a particular position (i.e., actually on one end of the plate 8 as shown in FIG. 2) with the racket (the throat portion) placed transeversely on the round rod 9, the racket will be caused to reach its balance by rotating the round rod 9, thus allowing one to obtain the property concerning the equilibrium of the racket from the position of the grip of the racket relative to the markings 10 (depending on the location the bottom portion of the racket grip is superimposed on the markings 10), that is to say, the properties of how suitable the racket is for drive or kill strokes can be known from the location of the equilibrium point and the relative position of the grip with respect to the indicia markings 10. When the round rod 9 is placed on one end of the flat plate 8 with the head (the middle of the frame) and the tail (the lower end of the grip) of the racket positioned on the round rod 9 and the stand 2, respectively, a portioh on the racket slightly below the throat of the racket will be pressed down by the base 42, thus allowing one to obtain the flex of the racket shaft.

In addition, the racket tester of the present invention may also comprise a weighing unit 12 disposed on the flat plate 8, such that the weight of the racket can be readily measured.

I claim:

1. A racket tester comprising:
    a flat plate;
    a support fixed on said plate;
    a knob attached with a screw rod, said knob being rotatably fixed on said support; and
    a pneumatic cylinder including a piston and a pressure gauge, said piston being threadingly engaged with said screw rod, and said pressure gauge being in communication with said cylinder, so as to indicate the air pressure within said cylinder; through the assembly of the above said members, when the netting face of a racket is placed between said plate and the bottom of said cylinder, said knob being rotated thereby causing said piston to displace downwardly a specific distance, so that specific volume is established between said piston and the inner wall of said cylinder through the bottom of said cylinder in response to the tension of the netting face, thus allowing one to know the tension of said netting face from the indication on said pressure gauge.

2. A racket tester according to claim 1 further comprising:
    a base protruding from said cylinder bottom and having a flate bottom surface; and
    a ring disposed directly under said base, such that when said netting face is placed between said bottom surface and said ring, said netting face is free to move over said ring, thereby allowing one to measure the tension over any particular area of said netting face at the operator's option.

3. A racket tester according to claim 2 further comprising:
    an incidia marking attached on said flat plate; and
    a round rod rotatably disposed at a particular position on said plate, such that when a racket is positioned transversely on said round rod, said racket is caused to reach its balance by rotating said rod, thus allowing one to obtain the property concerning the equilibrium of said racket from the position of the grip of said racket relative to said indicia marking.

4. A racket tester according to claim 2 further comprising:
    a round rod disposed on one end of said flat plate; and
    a stand disposed on the other end of said plate, such that when the head (the middle section of the frame) and the tail (the lower end of the grip) of the racket is placed on said round rod and said stand, respectively, and a portion on said racket slightly below the throat of said racket is pressed down by said base, one is allowed to obtain the flex of the shaft of said racket.

5. A racket tester according to claim 4 further comprising a weighing unit positioned on said flat plate so that the weight of said racket can be readily measured.

* * * * *